Figure 1:
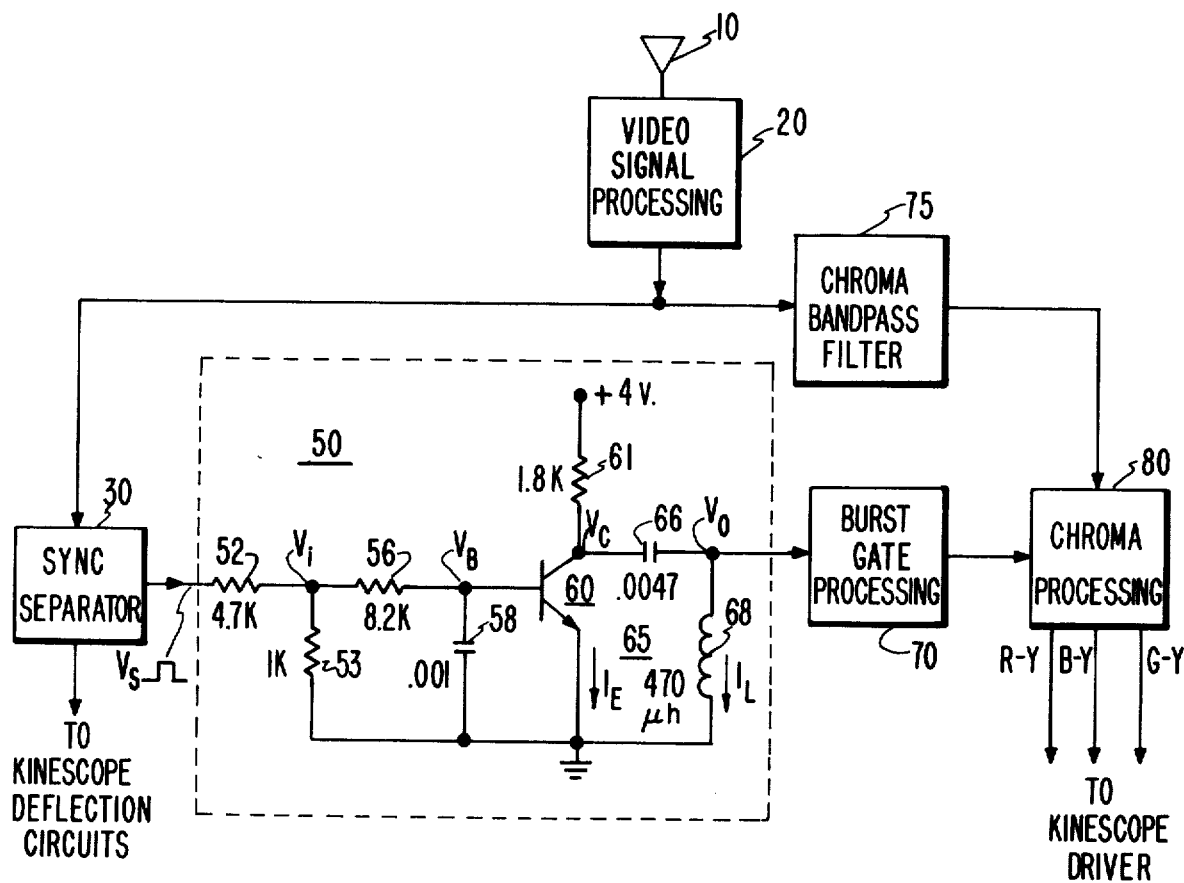

United States Patent
Sendelweck

[11] 4,051,518
[45] Sept. 27, 1977

[54] BURST GATE PULSE GENERATOR

[75] Inventor: Gene Karl Sendelweck, Indianapolis, Ind.

[73] Assignee: RCA Corporation, New York, N.Y.

[21] Appl. No.: 661,855

[22] Filed: Feb. 27, 1976

[51] Int. Cl.² .................................... H04N 9/46
[52] U.S. Cl. ............................................ 358/20
[58] Field of Search ........................... 358/19, 20; 178/69.5 CB

[56] References Cited

U.S. PATENT DOCUMENTS

| | | | |
|---|---|---|---|
| 2,905,748 | 9/1959 | Phillips | 358/20 |
| 2,956,125 | 10/1960 | Rausch | 178/69.5 CB |
| 3,544,708 | 12/1970 | Buechel | 358/20 |

Primary Examiner—John C. Martin
Assistant Examiner—Aristotelis M. Psitos
Attorney, Agent, or Firm—Eugene M. Whitacre; Ronald H. Kurdyla

[57] ABSTRACT

A burst gate pulse generating circuit includes a switching transistor having an input coupled to a source of pulses representative of a horizontal sync component of a video signal which includes a burst interval, and having an output coupled to an LC resonant circuit with a predetermined LC time constant. The resonant circuit is excited into ringing when the transistor conducts in response to an input pulse, and a resulting ringing waveform is used in conjunction with the inverse conduction characteristic of the transistor to turn off the transistor prior to the completion of one full cycle of ringing. An output voltage pulse is provided which is coincident with the burst interval and which corresponds to the first full half cycle of one polarity of the ringing waveform.

10 Claims, 8 Drawing Figures

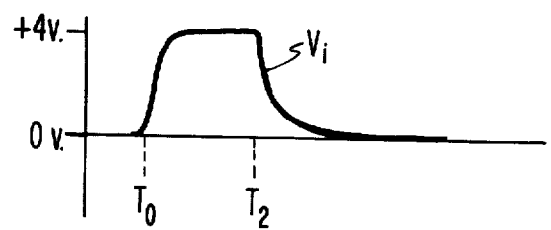
Fig.2
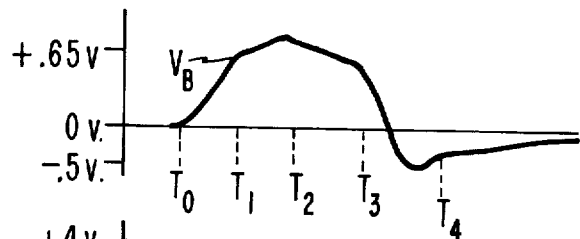
Fig.3
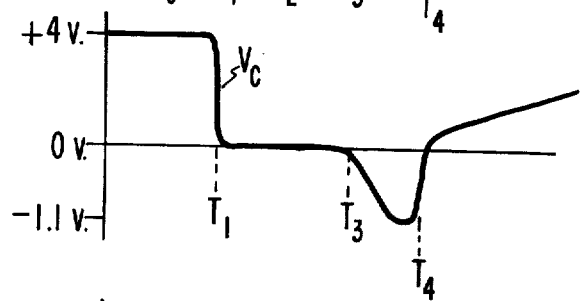
Fig.4
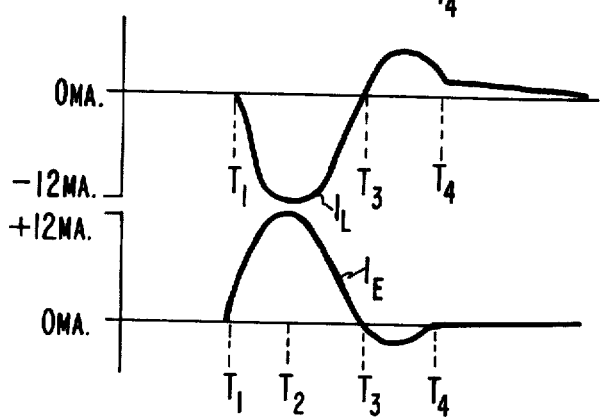
Fig.5
Fig.6
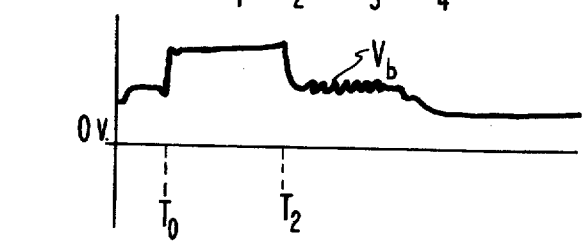
Fig.7
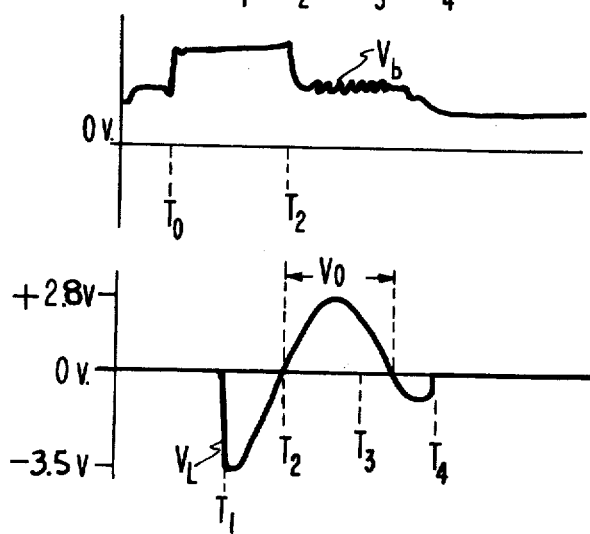
Fig.8

BURST GATE PULSE GENERATOR

This invention relates to pulse generating circuits and, more particularly, to such circuits for developing a gating signal to separate a color synchronizing burst reference signal from chrominance information of a composite color television video signal.

In a color television system such as the NTSC type adopted by the United States, for example, a composite color television video signal includes a chrominance (color) component with color information phase and amplitude modulated on a suppressed color subcarrier of 3.58 MHz, and a luminance (brightness) component. The video signal also includes synchronizing (sync) pulses occurring during a blanking interval, and a color burst reference signal in synchronized relationship with the color subcarrier. The burst component is represented by several cycles of a known phase of the subcarrier signal, and occurs shortly after a horizontal sync pulse during the blanking interval.

In a color television receiver for this system, the burst component is separated from the remainder of the video signal to provide a reference signal of proper phase and frequency for demodulating the color component. It has been customary in separating the burst component to apply to an amplifier only those signal frequencies in the upper portion of the video frequency range containing the burst and chrominance signal frequencies. By periodically gating the amplifier into conduction with gate pulses coincident with the burst interval of the video signal, the burst component is separated to the exclusion of the remainder of the applied signal.

A suitably timed burst gate pulse can be derived from a horizontal line flyback pulse produced by a horizontal deflection circuit of the television receiver. The horizontal sync pulse itself can also be used to derive the burst gate pulse, since the horizontal sync pulse is already present in the video signal in a fixed time relationship with the burst component. A burst gate pulse derived from a horizontal sync pulse may be preferred in some applications because the flyback pulse is susceptible to being misplaced relative to the burst interval by adjustment of, for example, the hold control in the horizontal deflection circuit. Adjustment of the horizontal circuit via the hold control may cause an undesirable change in the timing, amplitude or shape of the flyback pulse such that a portion of the flyback pulse may undesirably occur in time coincidence with some of the video information of the composite signal. In such a case, the gated amplifier will pass not only the burst component but also a portion of the video information. A burst gate pulse derived from the horizontal sync pulse is not affected by adjustment of the horizontal circuit.

It is desirable that circuits employed for obtaining a burst gate pulse from either a horizontal flyback pulse or a horizontal sync pulse should be relatively uncomplicated and inexpensive, and should provide accurate, noise-immune operation.

A burst gate pulse generator according to the present invention comprises a source of operating potential, an input circuit for providing a pulse representative of a horizontal synchronizing component of a color television video signal, and a transistor switch having an input electrode coupled to the input circuit, an output electrode coupled to the source of operating potential, and a common electrode. The burst gate pulse generator also includes a resonant circuit comprising at least an inductance and a capacitance. The resonant circuit has a predetermined time constant and is coupled to the output electrode of the transistor. The resonant circuit is excited into ringing when the transistor conducts in response to the input pulse to produce a ringing waveform with a period determined by the time constant. The resonant circuit coacts with an inverse conduction characteristic of the transistor to render the transistor non-conductive prior to completion of a first full cycle of the waveform to provide an output pulse corresponding to a first full half cycle of one polarity of the waveform and coincident with a burst interval of the video signal.

FIG. 1 of the drawing illustrates a portion of a color television receiver employing a circuit in accordance with the present invention.

FIGS. 2–8 show waveforms useful in understanding the operation of the circuit shown in FIG. 1.

Referring to FIG. 1, a video signal processing unit 20 is responsive to radio frequency television signals received by an antenna 10. Video signal processing unit 20 generates a composite video signal comprising chrominance, luminance, sound and synchronizing components by means of suitable intermediate frequency amplifier and detector circuits (not shown).

An output of signal processing unit 20 is coupled to a synchronizing (sync) signal separator 30 for separating horizontal and vertical sync pulses from the video signal. Separated horizontal and vertical sync pulses are applied to deflection circuits of an image reproducing kinescope (not shown). Horizontal sync pulses ($V_s$) are also coupled from an output of sync separator 30 to an input of a burst gate pulse generator 50, which will be described in greater detail subsequently. Burst gate output pulses from circuit 50 are coupled to an input of a burst gate processing unit 70. Burst gate processing unit 70 serves to provide a single burst gate pulse or push-pull burst gate pulses, according to the requirements of subsequent chroma processing circuits.

Video signals from signal processing unit 20 are also coupled to a chroma bandpass filter 75. Filter 75 selectively passes the relatively higher frequency chrominance component of the video signal. Output signals from bandpass filter 75 and output burst gate pulses from unit 70 are coupled to respective inputs of a chroma processing unit 80, which serves to derive color difference signals R-Y, B-Y and G-Y from the chrominance component of the video signal. The color difference signals are coupled to a kinescope driver unit (not shown) where they are matrixed with luminance (Y) signals conventionally derived from the video signal to produce red (R), blue (B) and green (G) color signals for driving a kinescope (not shown).

Burst gate pulse generator 50 includes an input voltage divider formed by a resistor 52 and a resistor 53, and an integrating network comprising a resistor 56 and a capacitor 58 coupled to a base of a transistor 60. Transistor 60 is arranged in common emitter configuration and may be of the commercial type MPS A20 marketed by Motorola Corporation. A collector of transistor 60 is coupled to a source of operating voltage (+4 volts) via a load resistor 61. A resonant circuit 65 including an inductor 68 and a capacitor 66 is coupled across a collector-emitter path of transistor 60. A burst gate output pulse ($V_O$) is developed by gating circuit 50 at the junction of capacitor 66 and inductor 68.

In the operation of circuit 50, reference is first made to FIG. 7, which illustrates a portion of a video signal showing the relative positions of the horizontal sync pulse component and the burst component in the video signal. It should be recognized that the illustrated portion of the waveform occurs during an interval of the order of ten microseconds and recurs at the line scanning rate. In FIG. 7, the horizontal sync component comprises a positive pulse occurring between a time $T_0$ and a later time $T_2$, followed by the burst interval shown containing about eight cycles of continuous wave subcarrier burst signal $V_b$.

Sync separator 30 provides an output sync pulse $V_s$, derived from the video signal, of a positive polarity and with a peak amplitude, for example, of 25 volts. Voltage divider resistors 52 and 53 attenuate sync pulse $V_s$ to provide a positive input pulse $V_i$ (FIG. 2) with a desired peak amplitude of 4 volts in this example.

Integrating network 56, 58 integrates pulse $V_i$ to produce a ramp voltage waveform $V_B$ (FIG. 3) at the base of transistor 60 between time $T_O$ and time $T_2$. Integrating network 56, 58 also serves to enhance the noise-immune operation of gating circuit 50.

The values of resistor 56 and capacitor 58 determine an RC time constant such that, after a predetermined length of time, the magnitude of the ramp voltage $V_B$ at the base of transistor 60 reaches about +0.65 volts. At this time, $T_1$, the base-emitter junction of transistor 60 is sufficiently forward biased so that transistor 60 conducts. Thus, resistor 56 and capacitor 58 delay by a predetermined amount the time at which transistor 60 conducts in response to pulse $V_i$ prior to the burst interval. It is noted that prior to time $T_1$ at which transistor 60 conducts, resonant circuit capacitor 66 had charged to the operating supply voltage (+4 volts) via resistor 61.

FIG. 4 represents a collector voltage waveform $V_C$ of transistor 60. The collector voltage $V_C$ rapidly drops to substantially zero volts when transistor 60 conducts at time $T_1$. Transistor 60 essentially serves as a switch such that when rendered conductive at time $T_1$, resonant circuit 65 is excited into ringing at its natural frequency. If is noted that at this time capacitor 66 is effectively in parallel with inductor 68 because of the low collector-emitter impedance of transistor 60 when switched into conduction. The ringing frequency of resonant circuit 65 is determined by the time constant established by the values of capacitor 66 and inductor 68. In this example, these values are chosen so that the time of one-half of one ringing cycle is substantially equal to the time of the burst interval (e.g., about 5 microseconds).

FIG. 5 illustrates the current ($I_L$) of inductor 68 when resonant circuit 65 is excited into ringing. FIG. 6 illustrates the related emitter current ($I_E$) of transistor 60 at the same time. Inductor current $I_L$ flows in a negative direction beginning at time $T_1$ and remains of a negative polarity for the first full one-half cycle of ringing until a time $T_3$. Emitter current $I_E$ of transistor 60 is coincident in time, but of an opposite polarity (positive), with respect to inductor current $I_L$. The voltage developed by inductor 68, $V_L$, leads the inductor current $I_L$ by 90° as depicted by FIG. 8.

At time $T_3$, after one-half of one ringing cycle has been completed, the polarity of inductor current $I_L$ changes from negative to positive and continues to be of positive polarity until time $T_4$, as indicated by FIG. 5. During this time period the polarity of the emitter current $I_E$ of transistor 60 changes from positive to negative as shown by FIG. 6. Thus during the time period $T_3$-$T_4$, emitter current $I_E$ and inductor current $I_L$ flow in a direction opposite to that shown for these currents in FIG. 1.

The roles of the collector and emitter of transistor 60 are effectively interchanged for the latter condition described above such that the emitter current $I_E$ of transistor 60 flows from the emitter to the collector of transistor 60 from time $T_3$ to time $T_4$. Transistor 60 continues to conduct from time $T_3$ to time $T_4$ but in an inverse current conduction mode in which transistor 60 exhibits a common emitter forward current transfer ratio ($h_{FE}$) reduced by about an order of magnitude.

Prior to time $T_3$, the base voltage $V_B$ of transistor 60 had begun to decrease when input pulse $V_i$ dropped toward zero volts at time $T_2$. From $T_3$ to time $T_4$ during which emitter current $I_E$ exhibits a negative polarity, the collector voltage $V_C$ of transistor 60 exhibits a negative polarity as shown by FIG. 4. During this time period the base voltage $V_B$ of transistor 60 may be considered to be pulled negative by the negative-going collector voltage $V_C$, as shown by FIG. 3, and base current flows from the base to the collector of transistor 60 since the base-collector junction of transistor 60 remains forward biased by about 0.65 volts. Transistor 60 therefore conducts negative current representative of the next half cycle of ringing between times $T_3$ and $T_4$. Also during this time, the charge on capacitor 58 continues to be depleted due to the conduction of transistor 60. A portion of the charge on capacitor 58 also is depleted via resistors 56 and 53.

As shown in FIGS. 5 and 6, at time $T_4$ inductor current $I_L$ attempts to change from positive to negative polarity and the related emitter current $I_E$ correspondingly attempts to change from negative to positive polarity. That is, the emitter of transistor 60 attempts to revert to its original role of supplying current in the direction indicated by FIG. 1. At this time, however, the baseemitter junction of transistor 60 is not sufficiently forward biased to maintain transistor 60 in conduction because the charge on capacitor 58 has been depleted, and transistor 60 turns off at the end of substantially one ringing cycle.

In accordance with the operation described above, gating circuit 50 produces an output burst gate pulse $V_0$ shown by FIG. 8. Output gate pulse $V_0$ is represented by the first full positive half cycle of inductor voltage $V_L$ which begins at $T_2$ and ends between $T_3$ and $T_4$. As can be seen from FIGS. 7 and 8, output gate pulse $V_0$ is coincident with the burst interval of the video signal containing burst component $V_b$. In this example, output gate pulse $V_0$ is provided to coincide with the burst interval by means of the time delay $T_O$-$T_1$ for delaying the initial conduction of transistor 60, and by means of the time delay $T_1$-$T_2$ associated with the time of the first quarter of the first full ringing cycle of inductor voltage $V_L$ (FIG. 8).

At time $T_4$ capacitor 66 begins to charge toward the operating supply voltage of 4 volts via resistor 61. In this context resistor 61 and capacitor 66 form an RC charging network with a time constant determined by the values of resistor 61 and capacitor 66 to be less than the time of one horizontal time scanning period (e.g., 63.5 microseconds). Capacitor 66 charges to substantially the level of the operating voltage supply by the end of the horizontal line scanning interval and prior to the arrival of the next sync pulse $V_S$. In connection with the function of resistor 61, it is also noted that a series resonant circuit comprising resistor 61, capacitor 66 and inductor 68 is formed when transistor 60 turns off at time T₄. Resistor 61 additionally serves to damp any tendency of the series resonant circuit so formed to ring at this time.

Although the invention has been disclosed in terms of a particular circuit embodiment, it should be appreciated that other arrangements may be devised by those skilled in the art without departing from the scope of the invention.

For example, the input pulse $V_S$ may be a horizontal sync pulse, as shown, or a flyback pulse derived from the horizontal deflection circuit of the television receiver. The timing of output gate pulse $V_0$ may be adjusted (i.e., delayed) to coincide with the burst interval by varying the value of either or both of capacitor 66 and inductor 68 to adjust the period of ringing of resonant circuit 65.

The time at which resonant circuit 65 is excited into ringing and hence the timing of output gate burst $V_0$ can also be tailored by employing various input circuit arrangements to delay the time at which transistor 60 initially conducts in response to pulse $V_i$. Such circuit arrangements are not essential, however, since a suitable delay for providing a properly timed output pulse $V_0$ can be achieved by adjusting the period of ringing of resonant circuit 65 as previously mentioned.

Although the operation of transistor 60 has been described in connection with capacitor 58, this capacitor is not required, for example, when input pulse $V_S$ is applied to the base-emitter circuit of transistor 60 from a low impedance source. A sufficiently low impedance input pulse source in combination with a ringing waveform of sufficient amplitude produced by resonant circuit 65 would enable the base of transistor 60 to remain sufficiently forward biased with respect to the emitter and collector of transistor 60 when transistor 60 is operating in the forward and inverse conduction modes during times $T_1$-$T_3$ and $T_3$-$T_4$, respectively, thereby permitting transistor 60 to remain conductive during one full ringing cycle $T_1$-$T_4$ as explained.

Lastly, it is noted that an output gate pulse $V_0$ of negative polarity can be produced by interchanging the relative positions of capacitor 66 and inductor 68. In this case, the voltage and current amplitude response of resonant circuit 65 would be of opposite polarity to those respectively shown in FIGS. 5, 6 and 8 for the disclosed embodiment of the present invention.

What is claimed is:

1. Apparatus for generating a burst gate pulse suitable for use in processing color information contained in a chrominance component of a color television video signal also having a horizontal synchronizing component and a color reference burst component occurring during a burst interval, said apparatus comprising:
a source of operating potential;
input means for providing a pulse representative of said horizontal synchronizing component;
transistor switch means having an inverse current conduction characteristic and an input electrode coupled to said input means, an output electrode coupled to said source of operating potential, and a common electrode, said output and common electrodes defining a main current conduction path therebetween; and
resonant circuit means comprising at least an inductance and a first capacitance, coupled across said main current conduction path of said transistor switch means and having a predetermined first time constant, said resonant circuit means being excited into ringing when said transistor switch means conducts in response to said pulse to produce a ringing waveform with a period determined by said first time constant and with a duration determined by current conduction of said transistor, wherein said resonant circuit means coacts with said inverse conduction characteristic of said transistor to render said transistor non-conductive prior to exceeding a first full cycle of said waveform, to inhibit amplitude excursions of said waveform beyond said first full cycle and to provide said waveform with an output pulse corresponding to a first full half cycle of one polarity of said waveform and coincident with said burst interval.

2. Apparatus according to claim 1, wherein said inductance and said first capacitance are coupled in series across said main current conduction path of said transistor.

3. Apparatus according to claim 2, wherein one end of said first capacitance remote from a point of interconnection of said inductance and first capacitance is coupled to said output electrode, and one end of said inductance remote from said point of interconnection is coupled to said common electrode.

4. Apparatus for generating a burst gate pulse suitable for use in processing color information contained in a chrominance component of a color television video signal also having a horizontal synchronizing component and a color reference burst component occurring during a burst interval, said apparatus comprising:
a source of operating potential;
input means for providing a pulse representative of said horizontal synchronizing component;
transistor switch means having an input electrode coupled to said input means, an output electrode coupled to said source of operating potential, and a common electrode; and
resonant circuit means comprising at least an inductance and a first capacitance coupled in series across a main current conduction path of said transistor, one end of said first capacitance remote from a point of interconnection of said inductance and said first capacitance being coupled to said output electrode and one end of said inductance remote from said point of interconnecting being coupled to said common electrode; said resonant circuit means having a predetermined first time constant and being excited into ringing when said transistor switch means conducts in response to said pulse to produce a ringing waveform with a period determined by said first time constant, wherein said resonant circuit means coacts with an inverse conduction characteristic of said transistor to render said transistor non-conductive prior to completion of a first full cycle of said waveform to provide said waveform with an output pulse corresponding to a first full half cycle of one polarity of said waveform and coincident with said burst interval, said output pulse being derived from said point of interconnection of said inductance and said first capacitance means and corresponding to a first full half cycle of positive polarity of a voltage developed across said inductance.

5. Apparatus according to claim 4 and further comprising:

charge storage means coupled to said input electrode for developing a voltage representative of said input pulse at said input electrode.

6. Apparatus according to claim 5, wherein said charge storage means comprises a second capacitance and wherein said apparatus further comprises:
 a first resistance coupled to said second capacitance to form an integrating network therewith for integrating said input pulse.

7. Apparatus according to claim 6, wherein the values of said first resistance and said second capacitance determined a second time constant for delaying by a predetermined amount the time at which said voltage developed by said second capacitance reaches a magnitude sufficient to render said transistor conductive to produce said ringing waveform.

8. Apparatus according to claim 7, wherein said first time constant is substantially equal to the time period of said burst interval.

9. Apparatus according to claim 8, wherein a second resistance couples said output electrode of said transistor to said source of operating potential and wherein the values of said second resistance and said first capacitance determine a third time constant such that said first capacitance charges to substantially the level of said operating potential via said second resistance after said transistor is rendered non-conductive and prior to a next succeeding input pulse.

10. Apparatus according to claim 9, wherein said input, output and common electrodes of said transistor respectively correspond to base, collector and emitter electrodes, and said transistor is arranged in common emitter configuration.

* * * * *